US007698323B1

(12) United States Patent
Rangan et al.

(10) Patent No.: US 7,698,323 B1
(45) Date of Patent: Apr. 13, 2010

(54) METHOD AND SYSTEM FOR ACCESSING AND MANAGING INFORMATION

(75) Inventors: Ravi Mangalam Rangan, Bothell, WA (US); Brian Jay Waldsmith, Bellevue, WA (US); Bruce R. Winegarden, Issaquah, WA (US); Franz Amador, Seattle, WA (US); Eric Kennedy Herman, Seattle, WA (US); Kwok Lung Chan, Bellevue, WA (US); William Zabriskie, Redmond, WA (US)

(73) Assignee: Centric Software, Inc., Campbell, CA (US)

( * ) Notice: Subject to any disclaimer, the term of this patent is extended or adjusted under 35 U.S.C. 154(b) by 203 days.

(21) Appl. No.: 11/115,052

(22) Filed: Apr. 26, 2005

Related U.S. Application Data

(60) Provisional application No. 60/565,495, filed on Apr. 26, 2004.

(51) Int. Cl.
*G06F 7/00* (2006.01)
*G06F 17/00* (2006.01)
(52) U.S. Cl. .................. 707/695; 715/229; 717/122; 717/170
(58) Field of Classification Search .......... 707/3, 707/4, 101, 203, 999.003, 999.203; 715/229; 717/122, 170
See application file for complete search history.

(56) References Cited

U.S. PATENT DOCUMENTS

| | | | |
|---|---|---|---|
| 6,546,388 B1 * | 4/2003 | Edlund et al. .......... 707/5 |
| 6,711,565 B1 * | 3/2004 | Subramaniam et al. ...... 707/3 |
| 6,782,383 B2 * | 8/2004 | Subramaniam et al. ...... 707/3 |
| 6,922,684 B1 * | 7/2005 | Aldridge et al. ........ 706/60 |
| 7,099,727 B2 * | 8/2006 | Wu et al. .............. 700/104 |
| 7,133,867 B2 * | 11/2006 | Irle et al. ............ 707/4 |
| 2003/0050886 A1 * | 3/2003 | Cohen et al. .......... 705/37 |
| 2004/0083194 A1 * | 4/2004 | Wu et al. ............. 706/45 |
| 2004/0162815 A1 * | 8/2004 | Irle et al. ............ 707/3 |
| 2004/0162816 A1 * | 8/2004 | Irle et al. ............ 707/3 |
| 2005/0080774 A1 * | 4/2005 | Janssen et al. ......... 707/3 |

* cited by examiner

*Primary Examiner*—John E Breene
*Assistant Examiner*—Phong Nguyen
(74) *Attorney, Agent, or Firm*—Beyer Law Group LLP

(57) ABSTRACT

A method and system for finding, accessing, connecting, and sharing information in the context of business activities. Authorized users may search and view information content from managed or unmanaged data repositories maintained at various locations. Users may connect and share this information to their business process (e.g., projects, products, and processes) without losing referential integrity. A virtual repository unifies information from multiple sources. On demand, information may be automatically managed and converted into structured information used to execute business processes.

20 Claims, 5 Drawing Sheets

METHOD AND SYSTEM FOR ACCESSING AND MANAGING INFORMATION

CROSS-REFERENCE TO RELATED APPLICATION

This application claims the benefit of U.S. Provisional Application No. 60/565,495, filed Apr. 26, 2004, entitled METHOD AND SYSTEM FOR ACCESSING AND MANAGING INFORMATION, which application is incorporated herein in its entirety.

FIELD OF THE INVENTION

This application relates generally to computers, and more particularly to accessing and managing information.

BACKGROUND

The widespread availability of computers and software applications has given organizations a powerful tool with which to create and access information. Within one organization, computers may be used by marketing, sales, accounting, management, maintenance, manufacturing, engineering, research, and other branches of the organization. Within one branch of an organization (e.g., marketing), users may predominately use one set of applications such as word processors, spreadsheets, presentation applications, and the like. Within another branch of the organization (e.g., engineering), users may predominately use other applications such as CAD programs, modeling programs, mathematical programs, and the like. Some applications, such as word processors, spreadsheets, and the like, may find widespread use throughout an entire organization. With these applications, users may generate and access a tremendous amount of information.

The information generated by users in the various branches of an organization may be stored in many locations. For example, some users may store some information on the hard drive of their personal computers. Other users may store information on a server that is accessible by users in their group. Many users may store information in a variety of locations, including local hard drives, peer hard drives, and local and distant servers. Within one company, there may be thousands of computers and hundreds of servers, each having a portion of the company's intellectual property.

Some information may be stored in managed storage solutions that automatically keep track of revisions to stored objects and may enforce a business process. Other information may be stored in unmanaged storage where users keep track of revisions to objects by file names, text within each stored item, meta-data, and the like and use ad-hoc business processes. The method for identifying revisions may vary from branch to branch, location to location, or even from user to user.

With the wealth of information available from so many sources in disparate locations, finding and accessing all the information that is relevant to a particular project, process, product, or the like often taxes even the most organized organizations. In addition, organizations are severely challenged with bringing unmanaged information under managed control in an easy manner. What is needed, then, is a method and system to easily find, access, connect, and share information.

Ideally, the method and system would provide an easy way bring unmanaged information under management by the system as needed.

SUMMARY

Briefly, the present invention provides a method and system for finding, accessing, connecting, and sharing information in the context of business activities. Authorized users may search and view information content from managed or unmanaged data repositories maintained at various locations. Users may connect and share this information to their business process (e.g., projects, products, and processes) without losing referential integrity. A virtual repository unifies information from multiple sources. On demand, information may be automatically managed and converted into structured information used to execute business processes.

In one aspect of the invention, information within files such as text, notes, attributes, properties, and product assembly structures may be searched without relying on predefined meta-data. Distributed software agents may scan relevant files and data stored on different network drives across multiple locations to deliver fast and up-to-date search results.

In another aspect of the invention, a common interface such as a Web browser with plug-in viewers or otherwise is provided to allow easy access and viewing of information contained in many types of file formats such as CAD drawings, office productivity suites, enterprise systems such as enterprise resource planning (ERP), product lifecycle management (PLM), and the like. In another aspect of the invention, both managed and unmanaged information may be accessed and viewed from a single interface and connected to the business process by means of persistent handles. The persistent handles may reference pre-defined indexes, which may be updated upon demand or just-in-time as needed. Information that is deleted or moved may be pruned or re-indexed. In another aspect of the invention, with a simple selection, information accessed through the search engine may be connected to the business process and unmanaged information may be turned into information that is managed by the system. Such unmanaged information may become managed almost instantly with automatic assignment of revision control identity and population of relevant meta-data tags.

In another aspect of the invention, the system may not allow information that is already managed by a system external to the system to be managed by the system.

Other advantages will become apparent from the following detailed description when taken in conjunction with the drawings, in which:

DETAILED DESCRIPTION

In the following detailed description of exemplary embodiments of the invention, reference is made to the accompanied drawings, which form a part hereof, and which are shown by way of illustration, specific exemplary embodiments of which the invention may be practiced. These embodiments are described in sufficient detail to enable those skilled in the art to practice the invention, and it is to be understood that other embodiments can be utilized, and other changes can be made, without departing from the spirit or scope of the present invention. The following detailed description is, therefore, not to be taken in a limiting sense, and the scope of the present invention is defined by the appended claims.

Unified modeling language (UML) class and activity diagrams are used to assist in describing various aspects of the invention. UML syntax is described in UML Distilled: A Brief Guide to the Standard Object Modeling Language by Martin Fowler, Addison-Wesley, Boston, Mass., 2004, which is hereby incorporated by reference.

Figure 1:
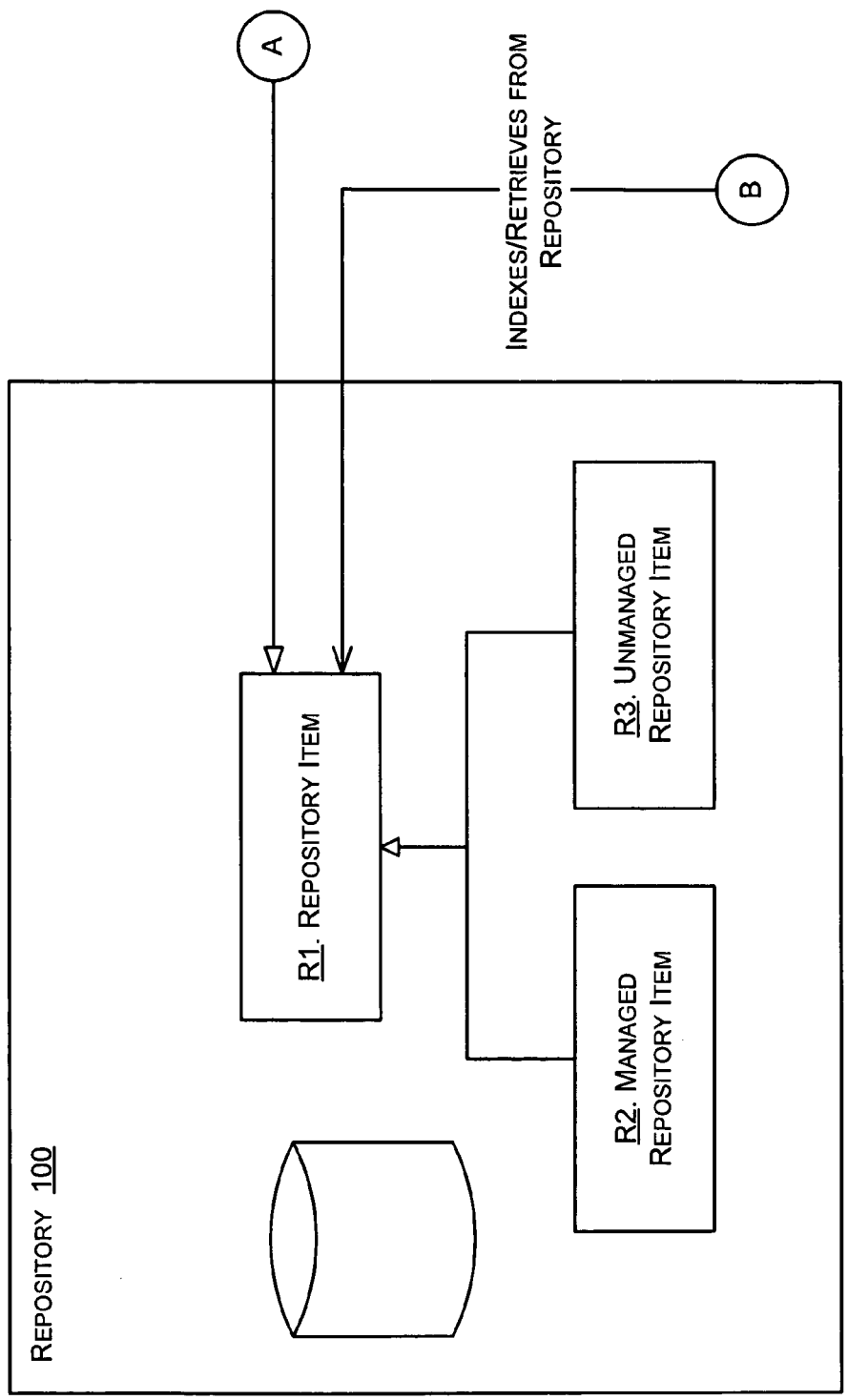
FIGS. 1-3 are block diagrams representing a UML class diagram showing classes and relationships between a product lifecycle management system, a search engine, and a repository in accordance with various aspects of the invention.
Figure 2:
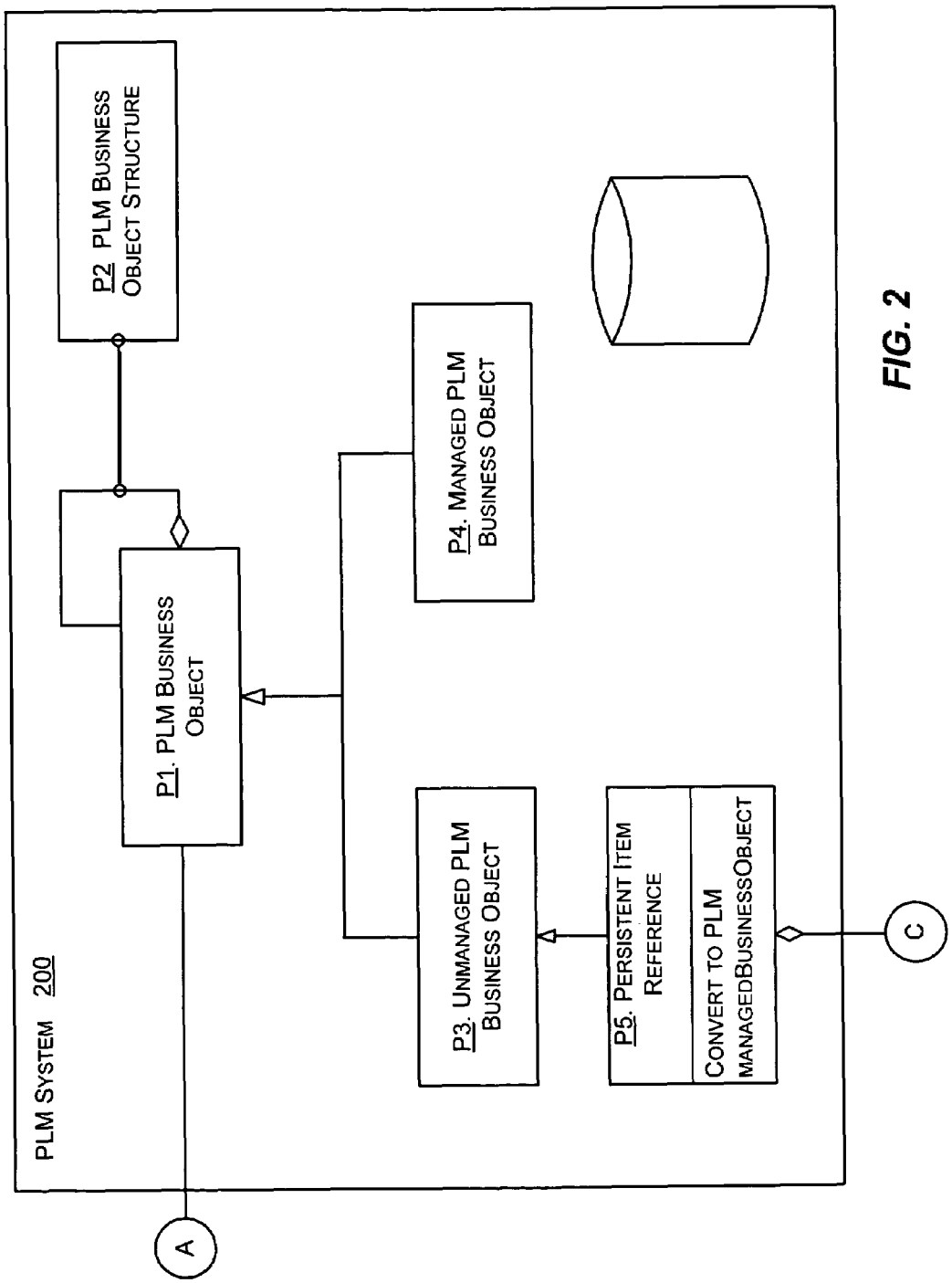
Figure 3:
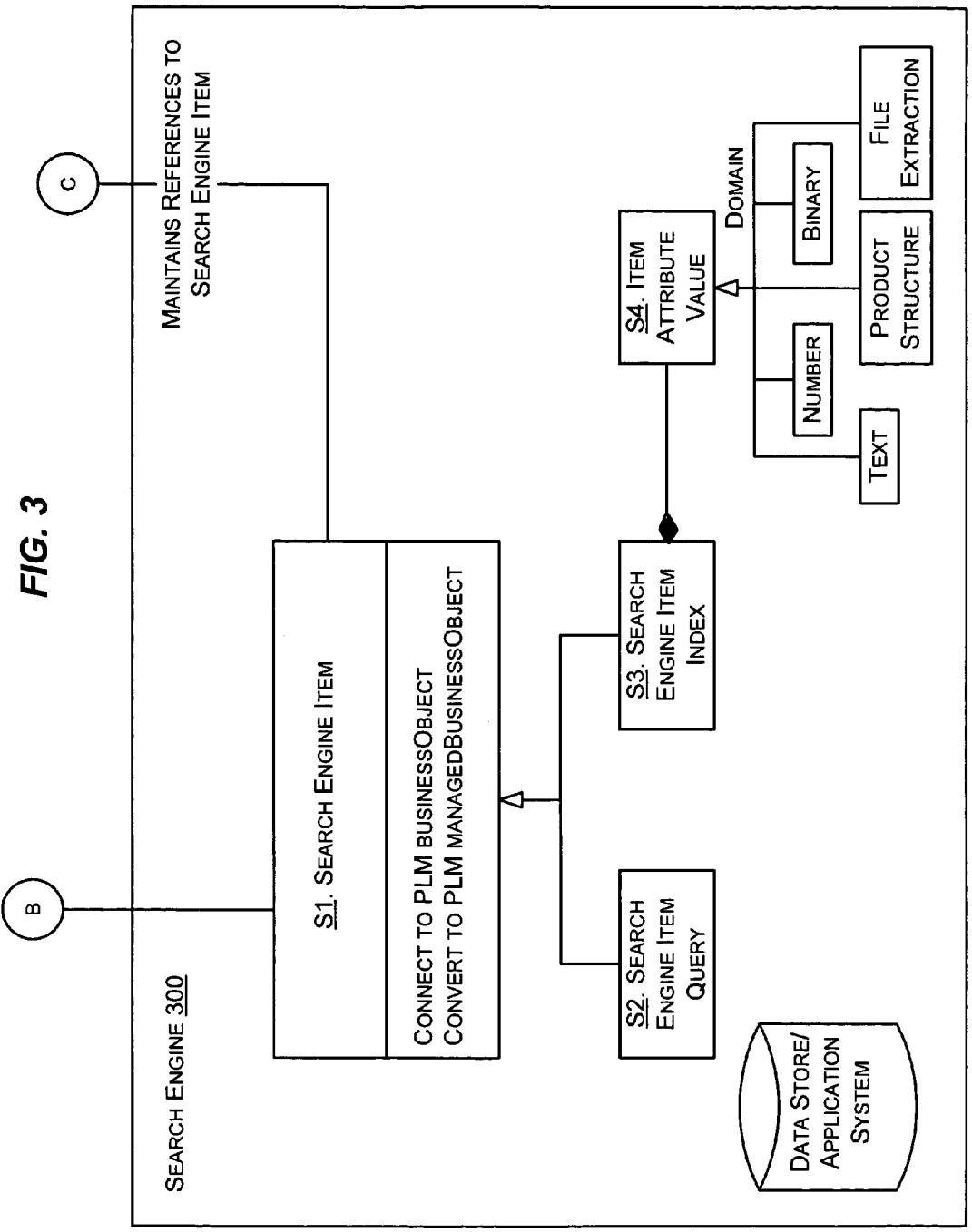

FIGS. 1-3 are block diagrams representing a UML class diagram showing classes and relationships between a product lifecycle management (PLM) system, a search engine, and a repository in accordance with various aspects of the invention. Turning to FIG. 2, a user may use a PLM system 200 to manage product lifecycle information. Product lifecycle management systems may manage product information throughout various phases of the product lifecycle. Product information may include, for example, information associated with requirements, design, system engineering, manufacturing, process, project management, production, service, corresponding processes, in-service, end-of-life, and the like.

Information in PLM systems may be represented as PLM business objects P1 together with relationships between the PLM business objects through PLM business object structures P2 as shown in the UML class diagram in FIG. 2. FIGS. 1-3 show a PLM system 200, a repository 100, and a search engine 300 together with relationships between and within these elements. A PLM business object P1 represents information and process that is of importance to the business in the context of executing and planning functions for one or more product life phases and, as such, encompasses both the information and the process definition. For example, a PLM business object P1 may include a scanned paper document, an electronic file, a record in a database, an information structure that represents information about products, processes, or projects, and the like. The PLM business object structure P2 captures relationships between different PLM business objects P1. An example of such relationships is described in further detail in conjunction with FIG. 4.

Turning to FIG. 1, a repository 100 is a data store or application system residing anywhere that is accessible by a computer, including, for example, a network reachable file system, laptop hard drive, workstation file system, a PLM system, and the like. A virtual repository comprises the sum of all repositories accessible by the search engine. A repository item R1 is an item that is stored within a repository and may represent an item in the real world. Examples of repository items may include parts, files, processes, geometry, systems, and the like. A repository item R1 may be a managed repository item R2 or an unmanaged repository item R3. A managed repository item R2 is a repository item that is controlled. A repository item that is controlled may only be changed or accessed according to well-defined business rules that the business and users must follow. Programmatically, the repository 100 (or a computer associated therewith) ensures that the access and business rules are followed. An example of the managed repository item R2 is an enterprise resource system, a PLM system (e.g., the PLM system 200 of FIG. 2), and the like, where users are required to follow specific rules to access and change information and execute business processes.

The unmanaged repository item R3 may represent a repository item where formal business rules may not be in place relative to how changes are made and access is controlled. An example of an unmanaged repository item is a file system directory that is accessible to various users in the network. In this case, users may add, delete, and change files without any specific business-related rules imposed by the repository.

Turning to FIG. 3, a search engine 300 is any application that is used to search one or more repositories for information. The search engine 300 may search on externally available information (e.g., file name, size, and the like) and/or information internal to or associated with the file (e.g., meta-data, content, and the like) using pre-processed indexes or by dynamically querying the repositories. A user or application may request that the search engine 300 search the one or more repositories by providing the search engine 300 with a query.

One or more search engine items S1 may be stored within the search engine 300. A search engine item S1 may maintain a dependent relationship to a repository item (e.g., repository item R1 of FIG. 1), either through a persistent query or a persistent index. Thus the search engine item S1 may be a search engine item query S2 or a search engine item index S3. The search engine item query S2 manages a predefined query that is to be executed against one or more repositories. An exemplary search engine item query may be a structured query language (SQL) query to retrieve all part information in a repository where the part number is '123'. A search engine item index S3 may manage a persistent index of the repository item such as its meta-data, product structure, and associated content including files. Search engine item indexes may be extracted from the source repository based on one or more specialized computer programs that understand the internal structure of the repository item being indexed and generate a search engine item index with one or more attribute-values. A search engine item index's item attribute-value S4 may comprise a list of attributes and values for the indexed item. The values may include text, numbers, images, product-structure, neutral files to facilitate viewing by applications other than the authoring application, and the like. An exemplary search engine item index's item attribute-value S4 may comprise a list of tuples for a part number and its textual value, the part name and its textual value, the part's description and its textual value, the part's product structure and its product structure value, and the part's image and its image value.

Turning again to FIG. 2, each PLM business object P1 may be an unmanaged PLM business object P3 or a managed PLM business object P4. Unmanaged PLM business objects P3 typically represent repository items that are external to the PLM system 200. Managed PLM business objects P4 represent PLM business objects that are managed by the PLM system 200 as discussed in more detail in conjunction with FIG. 4.

A persistent item reference P5 is a type of unmanaged PLM business object P3. Specifically, a persistent item reference P5 maintains a relationship between the PLM system 200's PLM business object P1 and the search engine's search engine item (e.g., search engine 300's of FIG. 3 search engine item S1). A persistent item reference P5 represents a connection between items in the PLM system 200 and items in the search engine (e.g., search engine 300 of FIG. 3). An exemplary persistent item reference data structure may comprise a tuple with a reference to a search engine item (e.g., search engine item S1 of FIG. 3) and a reference to a PLM business object P1. Another exemplary persistent item reference data structure may comprise a tuple with a reference to a search engine query (e.g., search engine item query S2 of FIG. 3) and a reference to a PLM business object P3 that implicitly relates the PLM business object to one or more search engine items.

Figure 4:
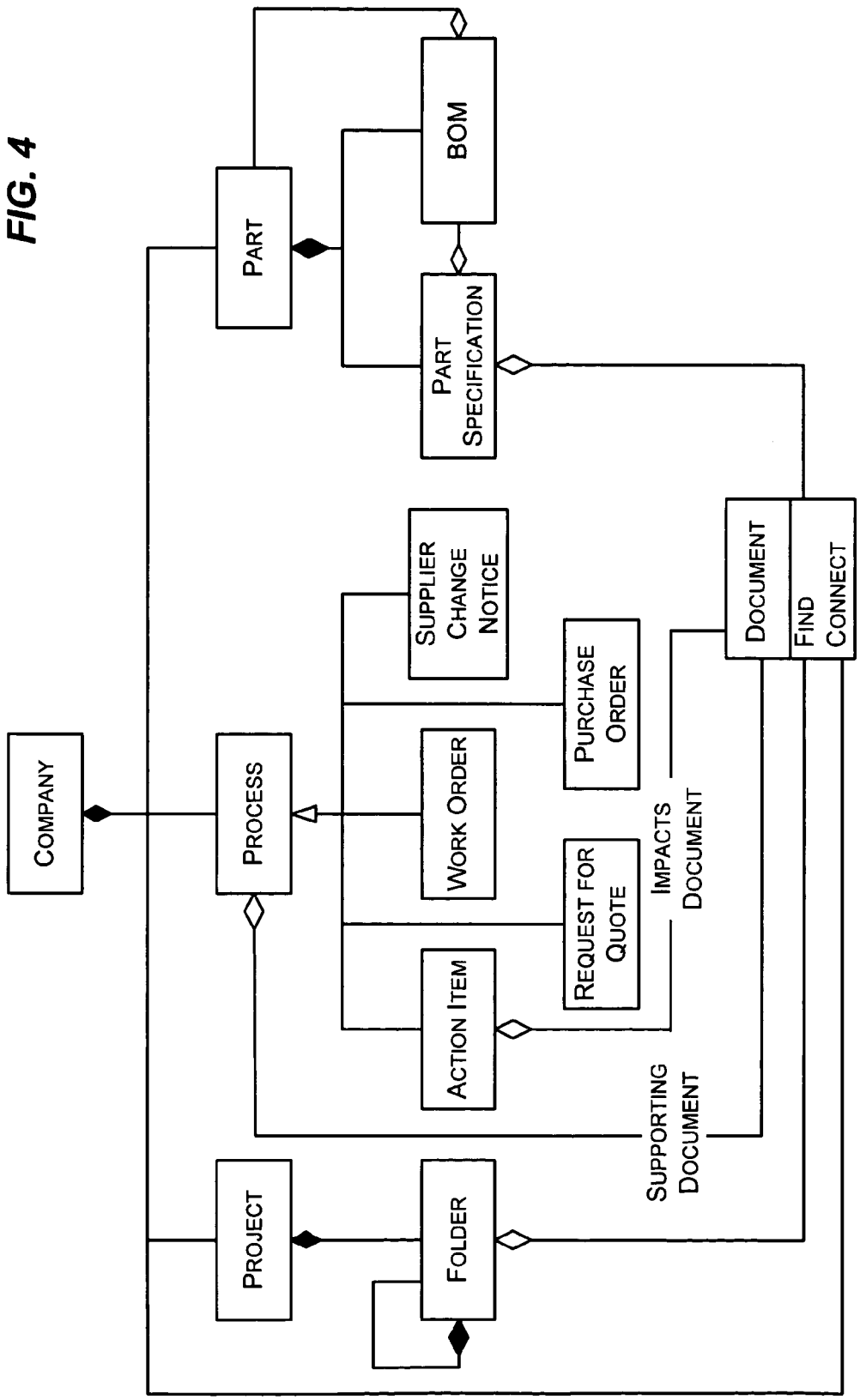
FIG. 4 is block diagram representing a UML class diagram that shows exemplary PLM business objects in accordance with various aspects of the invention.

FIG. 4 is block diagram representing a UML class diagram that shows exemplary PLM business objects in accordance with various aspects of the invention. For example, PLM business objects may include information associated with a company, projects, processes, parts, systems, modules, and the like. The PLM business object structure is shown in UML syntax as lines between various PLM business objects. For example, a project may serve as a context for work that is performed to realize specific objectives and may involve multiple parties that collaborate, share, and organize information. Projects typically organize information through a folder hierarchy structure. A process comprises a set of operations used to facilitate the management and/or execution of business activities. Processes may include, for example, one or more action items, change processes, purchase orders, requests for quote, work orders, and the like. Product information may be represented by PLM business objects such as parts, part specifications, hierarchically structured bills of material (BOMs). Documents may be related through PLM business object structure. It is noteworthy that since a PLM business object (e.g., PLM Business Object P1 of FIG. 2) may be stored as a managed repository item in a repository accessible via the search engine (e.g., Repository R1 of FIG. 1), the PLM business object may be automatically decomposed into finer-grain search engine items (through search indexing), and these decomposed items may be referenced by products, processes and projects as noted earlier. That is, the product information may be one or more configurations of a requirements decomposition, a system decomposition, a physical part decomposition, a process and service plan decomposition that are related through a network of traceability relationships, associated specifications, and documentation spread across a virtual repository. An exemplary managed PLM document may reveal a hierarchical structure of requirements through a search indexing process (e.g., Search Engine Item Index S3 of FIG. 3) which may be allocated to projects, products, or processes.

Figure 5:
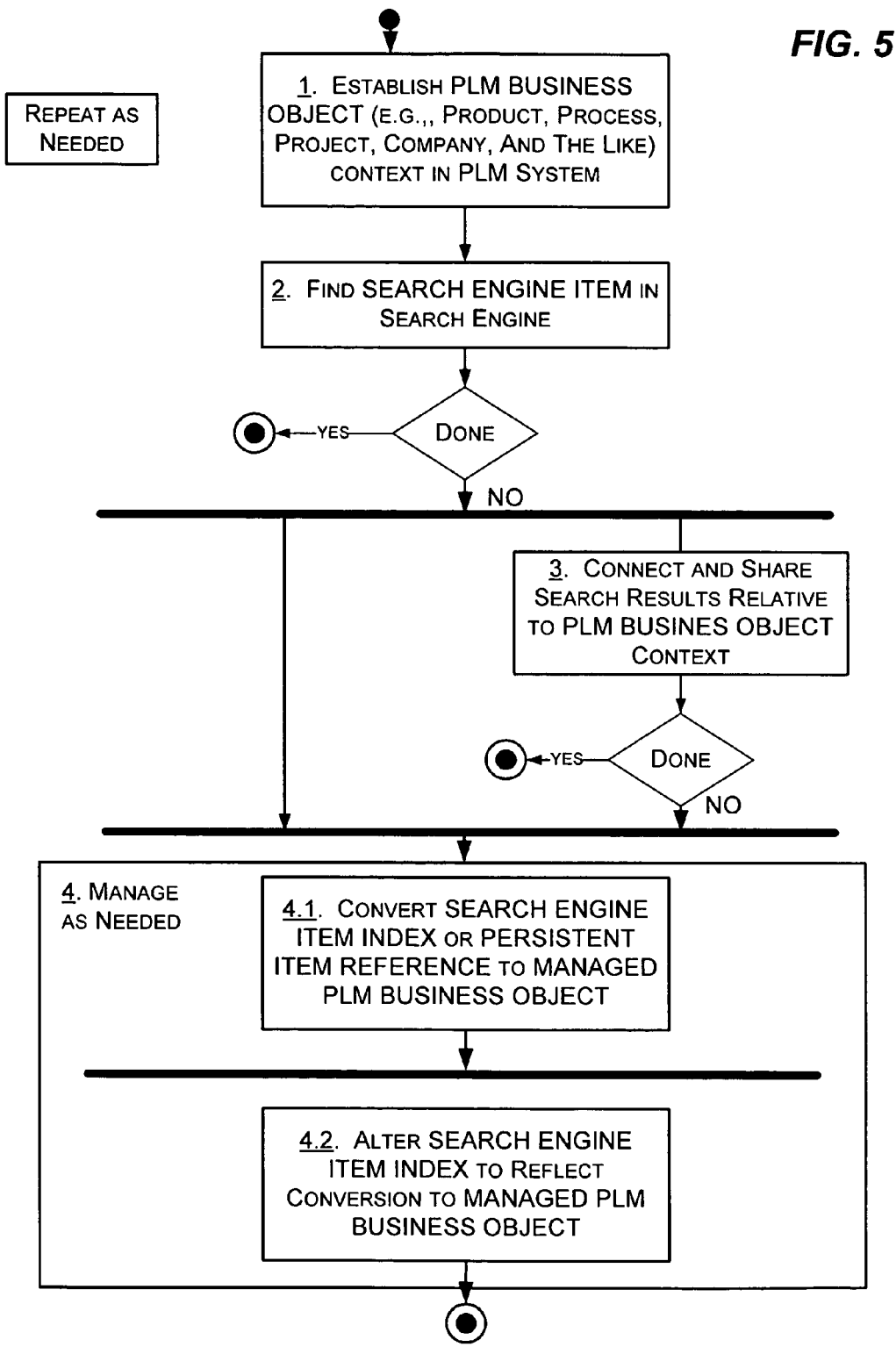
FIG. 5 is a UML activity diagram in accordance with various aspects of the invention.

FIG. 5 is a UML activity diagram in accordance with various aspects of the invention. At block 1, a user logs into a PLM system and makes a connection to a business context. In doing so, the user establishes a business context. The user may establish a business context by selecting, for example, a specific product, process, project, or company.

At block 2, within this context, the user may search for a search engine item (e.g., S1 of FIG. 3), which references a repository item (e.g., R1 of FIG. 1) located in a given repository, based on the user's access rights. Note that a search engine item (e.g., S1 of FIG. 3) may be a search engine query item (e.g., S2 of FIG. 3) or a search engine item index (e.g., S3 of FIG. 3). The search engine system performs a search against existing search engine items and presents the user with one or more results. The user may then browse the details of the returned search engine items (e.g., meta-data, product structure, and the contents of any associated files). The user may then decide to terminate the process or proceed to block 3.

At block 3, the user may then select one of more search engine items (e.g., S1 of FIG. 3) and establish a persistent item reference (e.g., P5 of FIG. 2) to the specific context (e.g. product, process, project, company, or the like) by invoking a method. Subsequently, the persistent item reference is maintained in the PLM system as another PLM business object. The user may then share this information with others by sending, for example, an e-mail. The e-mail may include a link that refers the recipient of the e-mail to the specific context.

When the method to connect a search engine item to a specific context (e.g., project, process, product, or company) is invoked, a persistent item reference is created corresponding to the search engine item. An exemplary data structure embodying a persistent item reference may include a tuple having a reference to the search engine item record and a reference to the PLM context.

Once the connection is made, users can send an e-mail to other parties defined in the system with a link to the PLM business object (e.g., P1 of FIG. 2) context. This allows each individual of the other parties to navigate and browse the information associated with the PLM business objects in the system (e.g., project, process, documents, products, and persistent item reference). Through this process users may also have where-used visibility allowing them to easily understand all the PLM references (e.g., P5 of FIG. 2) to a search item index (e.g., R1 of FIG. 3). The user may then decide to terminate the process or proceed to block 4.

At block 4, search engine items that correspond to unmanaged repository item (e.g., R3 of FIG. 1) are managed as needed. At sub block 4.1, the user may convert a search engine item directly, or by referencing the persistent item reference in the PLM system to a PLM business object by invoking a convert method. The convert method may extract the information from the search engine item index in the search engine or query it from the repository item and convert it to a PLM business object. The convert method may also populate the managed item with the appropriate meta-data, product structure, and files based on a conversion map. One exemplary conversion map is an XML document which defines how a search engine item and its attributes and structure map to a PLM business object and its attributes and structure. A portion of such an exemplary XML document may include the following:

<PLM-attribute>
<PLM-attribute name="document:description">
<searchengine-attribute name="document:comments"/>
</PLM-attribute>

This portion of an exemplary XML document includes a mapping that maps the searchengine item-attribute document:comments into the PLM business object-attribute document:description. It will be understood that additional or different mappings May be made without departing from the spirit or scope of the invention.

As another example, the user may review the search engine item index of a CAD model file with attributes such as parts and product structure and manage it by invoking a method that populates PLM business objects such as parts, part specification, and bill of material structures (noted in FIG. 4) in the PLM system. A product structure represents relationships between different parts such as an assembly, its components and sub-assemblies, associated drawings, and the like.

In another example, the user may convert all the items within a project, or export data corresponding to the project for management into another PLM system.

At sub-block 4.2, upon conversion, the search engine item index associated with the persistent item reference (or the repository item associated with the search engine item query) is transformed to resolve to the newly converted PLM business object. In addition, the repository item associated with the pre-transformed search engine item may optionally be deleted. Future requests for the converted PLM business object may then be referred to a repository managed by the PLM system. The search engine item index may be transformed to maintain overall referential integrity of the combined system.

After the search engine item index is transformed, a user querying for the newly converted search engine item will be presented with a result that resolves to the newly converted and managed PLM business object. A user querying the PLM system will also be presented with the same, and connections to existing PLM business objects may be preserved.

After the search engine item index is transformed, the user may continue to work with the repository item as before, thereby effectively managing the item in place. Actions on the original repository are synchronized with the PLM repository. This has the added benefit of minimizing process change while attaining the benefits of information management.

As can be seen from the foregoing detailed description, there is provided an improved method and system for accessing and managing information. While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

It is further noted that, in one example, the methods recited herein (including querying a search engine and obtaining therefrom an identifier that identifies a search engine query; associating the identifier with an unmanaged business object via a tuple stored by a component arranged to manage and make accessible product information via business objects, wherein an unmanaged business object's revisions are not automatically stored; and converting an unmanaged item included in the search engine query to a managed business object upon demand, wherein a managed business object's revisions are automatically stored) are carried out as a result of a computing system executing computer-executable instructions from a tangible computer-readable medium.

What is claimed is:

1. A system comprising a processor coupled to a memory, for managing and accessing data, comprising:
a set of one or more data repositories arranged to store items, wherein each item is data that represents an item in the real world, the item in the real world having a corresponding product lifecycle management (PLM) business object that represents information and process that is of importance to a business in the context of executing and planning functions for one or more product life phases, encompassing both the information and a definition of the process, wherein some of the items are managed and some are unmanaged, wherein a managed item's revisions are automatically controlled such that revisions to the managed item may only be made according to defined business rules, and wherein an unmanaged item's revisions are not automatically controlled;
a search engine arranged to search, within a selected particular context, for both managed and unmanaged items in the set of one or more repositories such that a result of the search may include both managed and unmanaged items from the set of one or more repositories; and
a component arranged to track revisions to, store, and make accessible product information, the component further arranged to query the search engine to obtain managed and unmanaged items from the set of one or more data repositories,
wherein the component is further arranged to receive an indication, based on user input to the system, of an unmanaged item in the result provided from the search engine, and to take the indicated unmanaged item from one of the repositories and establish a persistent reference to the indicated unmanaged item such that the indicated unmanaged item to be managed within the selected particular context, by automatically controlling revisions to that item, upon demand based on the received indication of the unmanaged item in the result provided by the search engine.

2. The system of claim 1, wherein the product information comprises information associated with requirements, design, system engineering, manufacturing, process, project management, production, service, corresponding processes, in-service, and end-of-life of a business object.

3. The system of claim 2, wherein the business object comprises one or more of a scanned paper document, an electronic file, a record in a database, and an information structure that represents information about products, processes, or projects.

4. The system of claim 2, wherein a business object structure relates the business object to another business object.

5. The system of claim 4, wherein the business object comprises a product definition that includes a part definition, part structure relationships including a bill of materials, relationships to specification documents, and contextual relationships to projects and processes through which business objects are created, modified, released, used, and changed.

6. The system of claim 1, wherein a business object structure relates the business object to a managed or unmanaged item or finer-grain search engine items as referenced through the search engine.

7. The system of claim 6, wherein the business object structure relating the business object to finer-grain search engine items is accomplished by the search engine being arranged to provide a persistent link to a search engine item associated with one or more of the items, wherein the persistent link includes an identifier to obtain the one or more of the items from the set of one or more repositories searched by the search engine, and the business object structure relating the business object to the persistent link.

8. The system of claim 7, wherein the component is further arranged to store the identifier for use in subsequent queries to the search engine.

9. The system of claim 1, wherein the component comprises a product lifecycle management system arranged to maintain and provides access to the product information over the lifetime of products associated with the product information.

10. The system of claim 1, wherein:
the search engine is accessed within the context of a business process as represented by a business object structure and implemented through a PLM system;
wherein the component is arranged to relate managed and unmanaged items retrieved from the search engine to the context of the business process.

11. A method executing on a processor coupled to a memory, for managing and accessing information, comprising:
querying a search engine to search for both managed and unmanaged items, to obtain a result of one or more search engine items that corresponds to a managed or unmanaged item in a virtual repository associated with the search engine, wherein each item is data that represents an item in the real world, the item in the real world having a corresponding product lifecycle management (PLM) business object that represents information and process that is of importance to a business in the context of executing and planning functions for one or more product life phases, encompassing both the information and a definition of the process, wherein some of the items are managed and some are unmanaged, wherein a managed item's revisions are automatically controlled such that revisions to the managed item may only be made according to defined business rules, and wherein an unmanaged item's revisions are not automatically controlled and wherein querying the search engine is from within a selected particular context; and upon demand based on an indication resulting from user input via a user interface, of an unmanaged item in the obtained result from the search engine, establishing a persistent reference to the indicated unmanaged item such that the indicated unmanaged item to be managed as a business object within the selected particular context by making the business object's revisions automatically controlled, and make accessible product information via business objects.

12. The method of claim 11, further comprising creating a persistent reference to the one or more search engine items to provide to the component, for use by the component to manage and make accessible product information via business objects.

13. The method of claim 11, wherein the business object comprises a project, a process, or product information.

14. The method of claim 13, wherein the process comprises one or more of an action item, a request for a quote, a work order, a purchase order, and a supplier change notice.

15. The method of claim 13, wherein the project is associated with a folder hierarchy structure that is maintained by the component.

16. The method of claim 13, wherein the product information comprises one or more configurations of a requirements decomposition, a system decomposition, a physical part decomposition, a process and service plan decomposition that are related through a network of traceability relationships, associated specifications, and documentation spread across the virtual repository.

17. The method of claim 11, wherein:

the managed item is an item that is controlled such that the managed item may only be changed or accessed according to well-defined business rules that a business and users must follow; and the unmanaged item is an item where formal business rules are not in place relative to how changes are made to the unmanaged item and how access to the unmanaged item is controlled.

18. A tangible computer-readable storage medium having computer-executable instructions for execution by a computing system comprising a processor coupled to a memory, the instructions comprising:

querying a search engine and obtaining therefrom an identifier that identifies a search engine query;

associating the identifier of the search engine query with an unmanaged business object via a tuple stored by a component arranged to manage and make accessible product information via business objects, wherein business objects represents information and process that is of importance to a business in the context of executing and planning functions for one or more product life phases, encompassing both the information and a definition of the process, wherein some of the business objects are managed and some are unmanaged, wherein a managed business object's revisions are automatically controlled such that revisions to the managed business object may only be made according to defined business rules, and wherein an unmanaged business object's revisions are not automatically controlled and stored, and wherein querying the search engine is from within a selected particular context of a business process; and receiving an indication, based on user input, of the unmanaged item to which the identifier of the search engine query has been associated and establishing a persistent reference to the indicated unmanaged item such that the indicated unmanaged item to be managed within the selected particular context as a managed business object upon demand, wherein a managed business object's revisions are automatically controlled and stored.

19. The tangible computer-readable storage medium of claim 18, wherein the search engine searches repositories including a repository that includes business objects managed by the component.

20. The tangible computer-readable storage medium of claim 18, further comprising associating the identifier with a context of a product, process, project, or company.

* * * * *